(12) United States Patent
Dausmann et al.

(10) Patent No.: US 9,104,176 B2
(45) Date of Patent: Aug. 11, 2015

(54) METHOD FOR THE PRODUCTION OF A MULTI-COLOR VOLUME HOLOGRAM, A DOCUMENT WITH SUCH A HOLOGRAM, AND A VOLUME HOLOGRAM MASTER

(75) Inventors: Guenther Dausmann, Grasbrunn (DE); Zishao Yang, Erding (DE)

(73) Assignee: Hologram Industries Research GmbH, Pliening-Ottersberg (DE)

( * ) Notice: Subject to any disclaimer, the term of this patent is extended or adjusted under 35 U.S.C. 154(b) by 713 days.

(21) Appl. No.: 12/451,556

(22) PCT Filed: Feb. 13, 2008

(86) PCT No.: PCT/DE2008/000262
§ 371 (c)(1),
(2), (4) Date: Nov. 18, 2009

(87) PCT Pub. No.: WO2008/145077
PCT Pub. Date: Dec. 4, 2008

(65) Prior Publication Data
US 2010/0073646 A1    Mar. 25, 2010

(30) Foreign Application Priority Data

Jun. 1, 2007 (DE) .......................... 10 2007 025 907

(51) Int. Cl.
*G03H 1/20* (2006.01)
*G03H 1/00* (2006.01)
(Continued)

(52) U.S. Cl.
CPC .............. *G03H 1/202* (2013.01); *G03H 1/0011* (2013.01); *G03H 1/041* (2013.01); *G03H 1/2249* (2013.01); *G03H 2001/0473* (2013.01); *G03H 2001/205* (2013.01); *G03H 2001/2263* (2013.01);
(Continued)

(58) Field of Classification Search
CPC ...................................................... G03H 1/202
See application file for complete search history.

(56) References Cited

U.S. PATENT DOCUMENTS

| 3,658,526 A | * | 4/1972 | Haugh ............................. 430/1 |
| 4,575,192 A | * | 3/1986 | Duthie et al. ................... 359/12 |
| 4,761,543 A | | 8/1988 | Hayden |

(Continued)

FOREIGN PATENT DOCUMENTS

| CA | 2 244 018 | 2/1999 |
| CA | 2 247 974 | 9/2007 |

(Continued)

OTHER PUBLICATIONS

Machine transdlation of JP 2006-349874.*

(Continued)

*Primary Examiner* — Martin Angebranndt
(74) *Attorney, Agent, or Firm* — Collard & Roe, P.C.

(57) ABSTRACT

The invention relates to a method for the production of a multicolor hologram by means of a capture beam, wherein the utilized capture beam (6) has a plurality of beam bundles of the same wavelength. Advantageously, the multicolor hologram is produced by copying the structure of multiple single-color subholograms of a master hologram (1) in a copy layer (5) which is affixed parallel to the master hologram, by illuminating this copy layer with the single-color capture beam. Each beam bundle appears at a prespecified angle of incidence, wherein the angles of incidence are calculated in such a manner that the structure of a corresponding subhologram is produced in the copy layer. In this way, a falsification is nearly impossible.

5 Claims, 3 Drawing Sheets

(51) Int. Cl.
*G03H 1/04* (2006.01)
*G03H 1/22* (2006.01)

(52) U.S. Cl.
CPC ........... *G03H2001/2271* (2013.01); *G03H 2001/2289* (2013.01)

(56) References Cited

U.S. PATENT DOCUMENTS

| | | | |
|---|---|---|---|
| 4,856,857 A | 8/1989 | Takeuchi et al. | |
| 4,913,990 A | 4/1990 | Rallison | |
| 5,083,850 A | 1/1992 | Mallik et al. | |
| 5,128,779 A | 7/1992 | Mallik | |
| 5,182,180 A | 1/1993 | Gambogi, Jr. et al. | |
| 5,499,118 A * | 3/1996 | Wreede et al. | 359/12 |
| 5,640,255 A | 6/1997 | Haines | |
| 5,856,048 A | 1/1999 | Tahara et al. | |
| 6,097,514 A | 8/2000 | Nishikawa | |
| 6,127,066 A * | 10/2000 | Ueda et al. | 430/1 |
| 6,687,031 B1 | 2/2004 | Kodama et al. | |
| 2002/0118409 A1* | 8/2002 | Stevenson | 359/2 |
| 2002/0163681 A1* | 11/2002 | Taggi et al. | 359/12 |
| 2002/0191234 A1 | 12/2002 | Ishimoto et al. | |
| 2003/0016408 A1 | 1/2003 | Kashiwagi et al. | |
| 2003/0230816 A1 | 12/2003 | Kappe et al. | |
| 2004/0100707 A1 | 5/2004 | Kay et al. | |
| 2004/0121241 A1 | 6/2004 | Kodama | |
| 2004/0175627 A1* | 9/2004 | Sutherland et al. | 430/1 |
| 2005/0012326 A1 | 1/2005 | Keller et al. | |
| 2005/0170259 A1 | 8/2005 | Holmes | |
| 2006/0072178 A1 | 4/2006 | Takabayashi et al. | |
| 2006/0121358 A1* | 6/2006 | Rich et al. | 430/1 |
| 2007/0064290 A1 | 3/2007 | Hochenbleicher et al. | |
| 2007/0171491 A1 | 7/2007 | Millington | |
| 2007/0195391 A1 | 8/2007 | Nishikawa et al. | |
| 2009/0162756 A1 | 6/2009 | Staub et al. | |
| 2009/0262407 A1* | 10/2009 | Dausmann et al. | 359/27 |
| 2010/0202028 A1* | 8/2010 | Menz et al. | 359/2 |
| 2011/0049864 A1 | 3/2011 | Menz et al. | |
| 2011/0212387 A1 | 9/2011 | Hansen et al. | |

FOREIGN PATENT DOCUMENTS

| | | | |
|---|---|---|---|
| DE | 198 09 503 | | 2/1999 |
| DE | 19809502 | * | 2/1999 |
| DE | 19802586 | * | 6/1999 |
| DE | 100 55 429 | | 5/2002 |
| DE | 100 36 505 | | 8/2003 |
| DE | 602 01 579 | | 1/2006 |
| DE | 10 2005 029 853 | | 1/2007 |
| EP | 0 701 183 | | 3/1996 |
| EP | 896260 | * | 2/1999 |
| EP | 0 919 961 | | 6/1999 |
| GB | 1358717 | * | 7/1974 |
| JP | 07-0923892 | * | 4/1995 |
| JP | 2002-366016 | * | 12/2002 |
| JP | 2005-331758 | | 12/2005 |
| JP | 2006-349874 | | 12/2006 |
| WO | WO 95/13568 | | 5/1995 |
| WO | WO 02/25326 | | 3/2002 |
| WO | WO 02/070275 | | 9/2002 |

OTHER PUBLICATIONS

Ohtaki et al., "Development of peripheral materials for color graphic arts holograms" Proc SPIE vol. 3956 pp. 245-252 (2000).*
Kodama et al., "Mastering process for color graphic arts holograms", Proc. SPIE vol. 4296 pp. 198-205 (2001).*
International Search Report.
International Search Report of PCT/DE2008/000261 (mailing date Jul. 31, 2008).
Hartmut Marwitz et al., Praxis der Holografie, Grundlagen, Standard—und Spezialverfahren expert verlag, 1990, pp. 400-413, ISBN 3-8169-0493-9, Germany.
Hartmut Marwitz et al., Praxis der Holografie, Grundlagen, Standard—und Spezialverfahren expert verlag, 1990, sections 21.5-21.7, pp. 401-412, ISBN 3-8169-0493-9, Germany.

* cited by examiner

METHOD FOR THE PRODUCTION OF A MULTI-COLOR VOLUME HOLOGRAM, A DOCUMENT WITH SUCH A HOLOGRAM, AND A VOLUME HOLOGRAM MASTER

CROSS REFERENCE TO RELATED APPLICATIONS

This application is the National Stage of PCT/DE2008/000262 filed on Feb. 13, 2008, which claims priority under 35 U.S.C. §119 of German Application No. 10 2007 025 907.9 filed on Jun. 1, 2007. The international application under PCT article 21(2) was not published in English.

The invention relates to a method for the production of a multi-colour volume hologram, a document with such a hologram, and a volume hologram master as they find application e.g. for/as hologram overlays for security documents for heightened protection against copying or reproduction.

A large number of various hologram technologies are now already applied in a wide variety of security documents, such as e.g. identity cards, passports, driving licences and financial documents. In most cases the level of recognition, at least for the "man or woman in the street" is very low. While these holograms already offer relatively good protection against copying and reproduction, they can, however, be reconstructed with a little effort by specialists.

Normally morphing and/or flip effects are used for purposes of recognition. By altering the viewing angle or the reconstruction angle, for example, one object can be continuously or discontinuously altered into another. This is of known art from e.g. U.S. Pat. No. 4,761,543, wherein the effect is visible in all the colours of the rainbow (embossed hologram=surface hologram), or from EP 0919961 B1, in which this effect can be presented in only one defined colour (volume hologram).

If the subject is a multi-colour volume hologram, according to the prior art this must either be captured with a plurality of lasers, or altered in colour after illumination by means of shrinkage or swelling over part or all of its area. In the case of shrinkage or swelling the captured object is stable in form apart from the colour and the reconstruction angle of the reconstruction beam alters. Left and right-hand viewing angles remain more or less stable for holograms captured according to the prior art.

The object of the invention is therefore to specify a method for the production of a multi-colour volume hologram with a defined, controlled colour alteration, such a volume hologram, and a document with such a hologram according to the above-cited genus, by means of which the effort for forgers in terms of material and time is increased such that a forgery is made almost impossible, wherein at the same time the best effects from experience for recognition and copying and reproduction security are to be unified and strengthened in one element.

This object is achieved by means of a method with the features described herein. Advantageous embodiments are also described herein.

Accordingly a multi-colour volume hologram is produced using at least one master hologram and a single monochromatic capture beam, i.e. copy beam at a wavelength in the UV-to-IR range, such as e.g. blue. The use of a monochromatic capture beam leads to simplified, and as a result more cost-effective production compared with production known from the prior art using multi-colour capture beams.

The monochromatic blue capture beam is preferably generated using a laser. Conventional monochromatic lasers can be used for this purpose.

It is to be recognised that for purposes of production of the coloured hologram according to the invention, in particular a volume hologram, a special master is to be used; this can be a volume hologram, a surface hologram (embossed hologram) or a combination of both.

It is of particular advantage if the multi-colour hologram is produced by copying the Bragg lattice planes of a plurality of monochromatic sub-holograms of a master hologram in a copy layer, which is e.g. affixed parallel to the master hologram, by illuminating the copy layer with the monochromatic capture beam. Here the capture beam consists of a bundle of beams of the same wavelength, wherein a suitable beam bundle is present for each sub-hologram. Each beam bundle impinges onto the copy layer at a predetermined incidence angle, which in each case is calculated such that the structure of the assigned sub-hologram is reproduced in the copy layer.

In this manner the Bragg lattice planes of a plurality of monochromatic sub-holograms can be copied simply and cost-effectively in a layer using a single monochromatic capture beam. Here each sub-hologram is part of a master hologram and is generated by the interference of two monochromatic waves, namely an object wave and a reference wave, in a layer, preferably a photolayer, in particular with an index-match material (e.g. a fluid).

The photolayer is affixed onto the master hologram, preferably with an index-match material or by means of lamination, and is then illuminated with the monochromatic capture beam. A bundle of the capture beam, that is assigned to a sub-hologram, is then refracted on the side/face of the sub-hologram facing towards the photolayer, is then reflected, i.e. diffracted on the Bragg lattice planes of the sub-hologram, and thus is deflected back into the photolayer. The original bundle of the capture beam then interferes with the deflected bundle of the capture beam in the photolayer. Bragg lattice planes thereby form in the photolayer, which are similar to the Bragg lattice planes of the sub-hologram.

The master hologram is selected or produced with a plurality of monochromatic sub-holograms, in particular with a blue, a green and a red sub-hologram. Here each of the monochromatic sub-holograms is generated using reference beams with differing incidence angles. Here the monochromatic capture beam used for copying the various Bragg planes of the sub-holograms in the photolayer has a plurality of sub-beams with the same wavelength but differing incidence angles. The incidence angle of each sub-beam is in each case matched to the process of copying a Bragg lattice plane.

Needless to say, the method is not limited to light wavelengths in the visible spectrum, but can also be applied in the ultraviolet (UV) or infrared (IR) regions. If there are no coherent light sources available in the desired spectral range, the hologram can be produced with another wavelength and tuned as necessary to the required wavelength using shrinkage or swelling.

If an embossed hologram is used as a "master" for a "blue contact copy" the lattices must conform to the rules relating to very flat angles. It should be noted that in this case the higher orders of diffraction can generate colour effects that can be enhanced or eliminated by means of suitable design and calculation.

For a full-colour design of a hologram according to the invention at least one blue, one green and one red hologram must, of course, be present. By means of graphical combinations, overlays, etc a true-colour hologram can thus be copied from one master hologram using this method. With a corresponding arrangement of the individual colour elements tilt effects (also black-and-white by means of colour mixing), run effects, deformation and modification effects (morphing) can now also be achieved in true colour, without using other lasers to generate the capture beam in other colour, i.e. wavelengths.

The master hologram is preferably selected with a plurality of regions (pixels) that in each case have at least one or a plurality of monochromatic sub-holograms, which in particular are generated with differing angles of incidence of the reference beams.

The fact that a volume hologram can be mass produced with this method, which e.g. has a three-colour reconstruction process, but which was captured/produced/copied using only a single wavelength, is an enormous leap forward in rationalisation.

If someone wishes to copy/forge such a hologram according to the invention, a plurality of lasers must be used with differing angles for each element of the image. Thus a copy is virtually inconceivable. Reproduction is made extremely difficult as a result of complex design and the already difficult capture methods for true-colour volume holograms.

For mass production of a true-colour hologram/feature protected against copying and reproduction an ancillary hologram is used in a particular embodiment of the above-described method. Here in particular a reflection master is firstly produced, which consists of a summation of elementary master holograms (in the form of pixels/regions). Here each pixel preferably has three monochromatic sub-holograms in three differing colours and can be read out at one wavelength, e.g. with blue, in accordance with the previously described method. The special feature is now to be seen in particular in the fact that each colour, or each pixel, has a previously defined reconstruction angle. This now means that the incidence angle of the reference beam is individual for each pixel, or for each colour. In turn this means that for the photolayer (contact copy) the copy beams must also comply with these geometries, so that the Bragg conditions necessary for reconstruction are fulfilled.

The copy beam is therefore a maze of apparently chaotic beam bundles, although in the master process these are in fact accurately calculated and defined in accordance with the specifications of the graphic/coloured design. In order to reproduce the maze of beams easily and to prepare for mass production, a transmission hologram or a reflection hologram is e.g. captured with an "object", which represents the beams necessary for reconstruction of the master, With the aid of this ancillary hologram, which accordingly is to be arranged preferably on the side of the copy-photolayer facing away from the master hologram, a monochromatic copy/capture beam can now be generated easily and cost-effectively after illumination of the ancillary hologram with a monochromatic parallel (laser) beam; this copy/capture beam consists of a plurality of beam bundles of the same wavelength but with differing incidence angles. With the aid of this ancillary hologram (preferably computer-generated) the copying process can now take place and mass production of a feature can be executed; without additional measures, such as swelling and shrinkage, this cannot be forged at the present time.

In what follows the invention is elucidated in more detail with the aid of a plurality of examples of embodiment with reference to the drawings.

Figure 1:
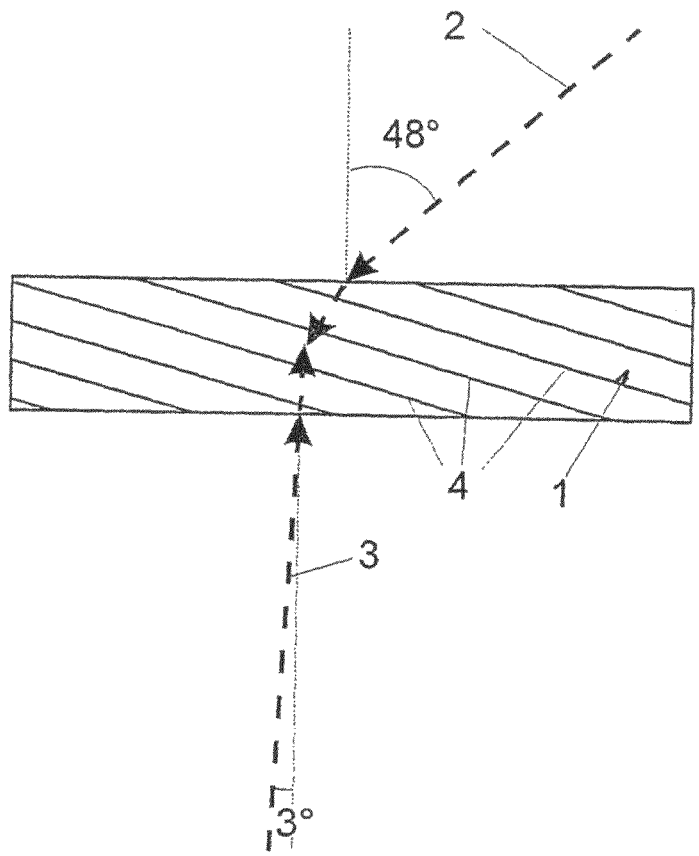
FIG. 1 shows a schematic representation of the generation of a (red) master hologram.

FIG. 1 shows the first step of the method according to the invention, namely the creation e.g. of a red (master) hologram 1, i.e. a volume lattice capture under the illumination of a photolayer 5 with two waves/beams 2 and 3 with the wavelength 633 nm. Here a red reference beam 2 impinges at an angle of 48° onto the surface of the master hologram and is refracted into the latter (2'). At the same time an object beam 3 coming from the opposite direction impinges at an angle of 3° onto the lower surface of the master hologram and enters into the hologram 1 virtually unrefracted. Bragg lattice planes 4 at a separation distance defined by the capture wavelength are now generated as a result of interference of the beams in the hologram layer 1. The hologram 1 (the master) is then developed using photographic technology in order to achieve sufficient efficiency for the copying process.

Figure 2:
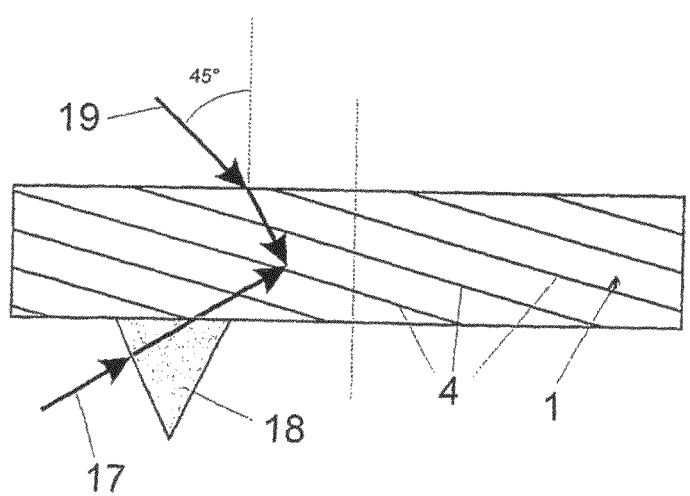
FIG. 2 shows a representation of the generation of a red master hologram in a variant with a blue wavelength and a coupling-in element.

FIG. 2 represents an example in which the "red" master hologram with the blue wavelength (e.g. 476 nm) is produced directly using a coupling-in element, here a prism 18. Here the beams 17 and 19 represent the object and reference beams respectively.

Figure 3:
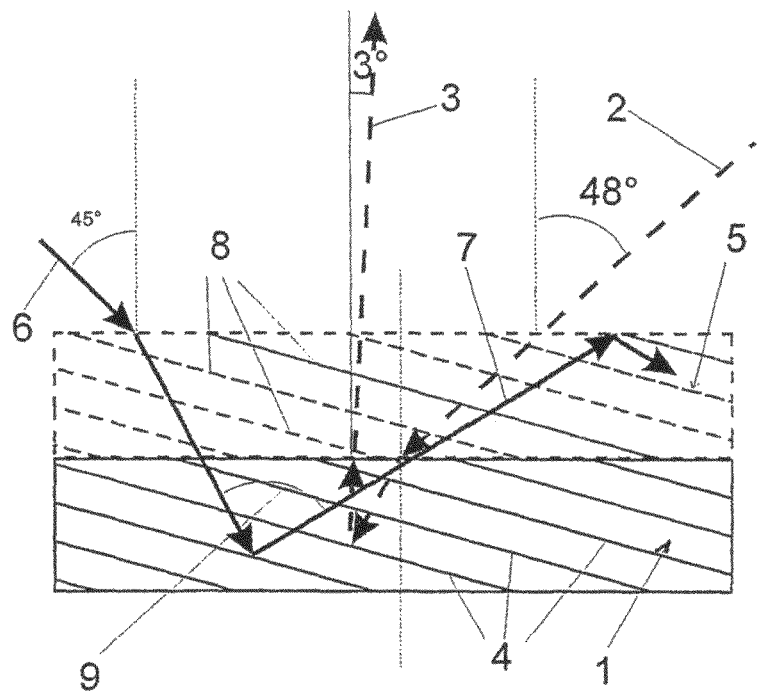
FIG. 3 shows a schematic sectional view of a monochromatic master hologram with a copy-photolayer.

FIG. 3 illustrates a subsequent step of the method, wherein the procedure (for purposes of simplifying the explanation) is represented with the aid of a "red" master volume hologram 1 and a "blue" copy laser beam 6. An unilluminated photomaterial has previously been brought into contact as a copy-photolayer 5 with the "master" 1 produced as per FIG. 1; it is preferably laminated on, or an index-match material is used. The photolayer 5 is now copied as a new hologram from the original "red" master hologram 1 with a blue (e.g. 476 nm) laser copy beam 6. Here the copy beam 6, coming from the left at an angle of 45°, impinges onto the film sandwich. The beam 6 is refracted (6') into the photolayer 5 (dense medium), firstly passes through the still unilluminated material of the copy layer 5 and impinges onto the lower master hologram 1, where it is diffracted on the latter's Bragg planes 4, i.e. it is reflected as a beam 7 in the direction of the copy layer 5 ("new" hologram). In the photo/copy layer 5 the beams 6 and 7 now interfere with each other and form new lattice planes 8, which in geometry and separation distance correspond to the lattice planes of the hologram 1. If the newly generated hologram 5 is now illuminated with white light at an angle of approx. 48° (white reflection beam 2a) from the right-hand side, it then reconstructs red light again (red reconstruction beam 3a). In order to achieve what is a relatively large lattice separation for red light with blue light, a very large angle 9 is necessary between beams 6 and 7. With the specification of 45° for the incidence angle of the copy beam 6, such a flat angle ensues in the master medium for the sub-beam 7 that total reflection would occur at its upper surface. In order to prevent this for the geometry selected in the example, it is necessary for the contact copy to use an index-match material, by means of which the beam 7 is coupled into the copy medium. As a result total reflection occurs only on the upper surface of the copy layer 5, which does not affect the copying process.

Figure 4:
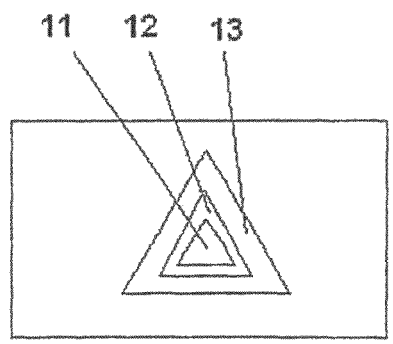
FIG. 4 shows a schematic view of a master volume hologram according to the invention with a plurality of sub-holograms.

FIG. 4 represents a master hologram with blue 11 (e.g. 443 nm), green 12 (e.g. 543 nm) and red 13 (e.g. 633 nm) sub-holograms. The capture geometry is e.g. calculated for the red sub-hologram 13 such that with reconstruction/copying using a blue laser (e.g. 476 nm) with a reconstruction angle/incidence angle of e.g. 45°, a contact copy is possible, as represented in FIG. 2. For the green 12 and blue 11 sub-holograms capture geometries of 45° are also calculated for a blue copy beam. The calculation is to be executed such that after receipt of the contact copy, or with reconstruction using white light all colours are to be seen in the contact copy at the same, i.e. the desired, viewing angle.

Thus a multi-colour volume hologram can be captured/produced/copied using only one (blue) wavelength.

Figure 5:
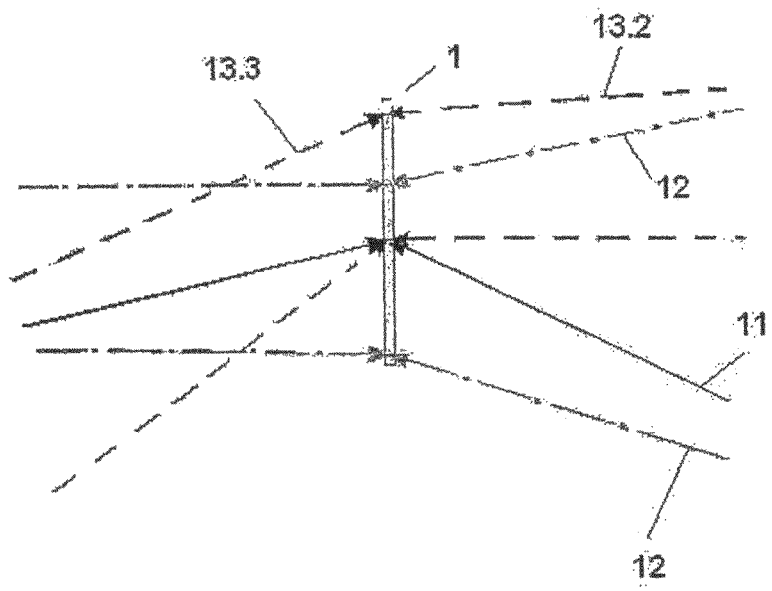
FIG. 5 shows a schematic view of a master volume hologram according to the invention with respective object and reference beams of the sub-holograms present.

FIG. 5 demonstrates how a master hologram 1 is generated with blue 11, green 12 and red 13 sub-holograms (master capture). Each of the sub-holograms is obtained by the interference of two monochromatic plane waves, an object wave 3 (on the left in the figure) and a reference wave 2 (on the right in the figure).

Figure 6:
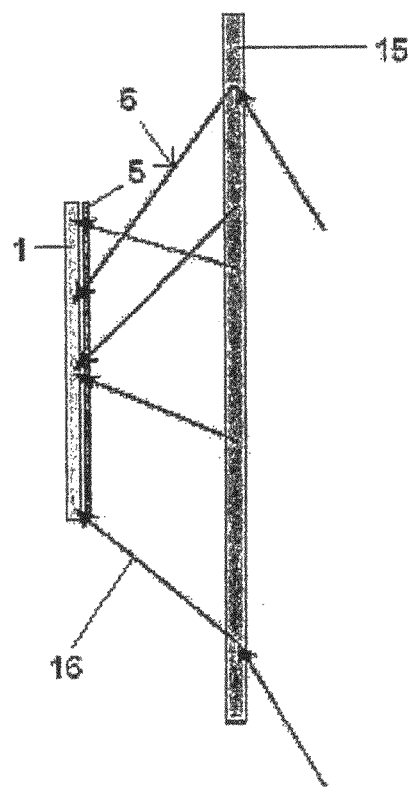
FIG. 6 shows a schematic view of a master volume hologram during the production of a contact copy with monochromatic copy beams with angle adjustment with the aid of an ancillary hologram.

Finally FIG. 6 represents how a master hologram 1, provided with a copy photolayer 5, is radiated with a copy beam 6, which is a maze of apparently chaotic beam bundles 16. In the master process, however, these are accurately calculated and defined in accordance with the specifications of the graphic/coloured design. In order to reproduce the maze of beams easily and to prepare for mass production, an ancillary hologram 15 is provided, e.g. a transmission hologram (represented), or a reflection hologram (not represented), captured with an "object", which represents the beams necessary for the reconstruction of the master. With the aid of this hologram the copying process can now take place and mass production of a true colour hologram that is secure against forgery can be executed.

REFERENCE SYMBOL LIST 1. master hologram
2. (red) reference beam
2a (white) reconstruction wave
3. (red) object beam
3a (red) reconstruction wave
4. Bragg lattice planes
5. copy-photolayer (new hologram)
6. copy beam (blue laser)
7. copy sub-beam—(diffracted)
8. Bragg lattice planes
9. diffraction angle
10. - - -
11. blue sub-hologram
12. green sub-hologram
13. red sub-hologram
14. - - -
15. ancillary hologram
16. copy beam bundle
17. object beam (blue)
18. prism
19. reference beam (blue)

The invention claimed is:

1. A method for the production of a multi-color volume reflection hologram, the method consisting essentially of the following steps:
   provision of only one master reflection hologram with a plurality of differing single-color reflection sub-holograms with a fixed design, which fulfill the relevant Bragg conditions and comply with the particular reconstruction beams in each case, the plurality of differing single-color reflection sub-holograms being stored in a single layer of the single master reflection hologram,
   affixation of a copy layer onto the master reflection hologram with an index-match material, or by laminating,
   generation of a contact copy by copying the structure of the master reflection hologram into the assigned copy layer using only one exposure of a single-color copy beam of coherent light of a wavelength in the ultraviolet to infrared range, the single-color copy beam being composed of a multiplicity of copy beam bundles of the same wavelength,
   wherein each of the copy beams bundles impinges at a predetermined incidence angle onto the structure formed by the master reflection hologram and the copy layer,
   wherein the incidence angle of each of the copy beams bundles is calculated such that the structure of the assigned sub-hologram is reproduced in the copy layer,
   wherein the capture geometry of each monochromatic sub-hologram is calculated such that with reconstruction or copying using a single-monochromatic laser, e.g. a blue laser, with the predetermined incidence angle, a contact copy is obtained, such that in the so obtained contact copy, whilst the reconstruction uses white light, all colors are to be seen in the contact copy of the same, i.e. desired, viewing angle, and wherein the multiplicity of copy beams bundles are not generated by an ancillary hologram.

2. The method according to claim 1, wherein the single-color reflection sub-holograms are at least one of a red, a green and a blue sub-hologram.

3. The method according to claim 1, wherein the master reflection hologram is produced with at least one reflection volume hologram.

4. The method according to claim 1, wherein the master reflection hologram is selected or produced with a plurality of hologram regions (pixels) with a plurality of single-color, large-area or small-area superimposed differing Bragg lattices, sub-holograms, which are copied at 1:1 with a shorter wavelength.

5. The method according to claim 1, wherein the single-color copy beam has a wavelength corresponding to blue light, e.g. of 476 nm.

* * * * *